United States Patent
Irish et al.

(10) Patent No.: US 7,961,732 B2
(45) Date of Patent: Jun. 14, 2011

(54) METHOD AND HARDWARE APPARATUS FOR IMPLEMENTING FRAME ALTERATION COMMANDS

(75) Inventors: John David Irish, Rochester, MN (US); Ibrahim Abdel-Rahman Ouda, Rochester, MN (US); James A. Steenburgh, Rochester, MN (US); Jason Andrew Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 12/044,998

(22) Filed: Mar. 9, 2008

(65) Prior Publication Data

US 2008/0162893 A1    Jul. 3, 2008

Related U.S. Application Data

(63) Continuation of application No. 10/463,281, filed on Jun. 17, 2003, now Pat. No. 7,362,753.

(51) Int. Cl.
*H04L 12/28* (2006.01)
*G06F 15/167* (2006.01)
*G06F 15/173* (2006.01)

(52) U.S. Cl. ............... 370/392; 370/395.63; 709/212; 709/238

(58) Field of Classification Search .................. None
See application file for complete search history.

(56) References Cited

U.S. PATENT DOCUMENTS

| | | | |
|---|---|---|---|
| 6,157,641 A | 12/2000 | Wilford | |
| 6,904,057 B2 | 6/2005 | Sarkinen et al. | |
| 7,218,647 B2 | 5/2007 | Ozguner | |
| 7,240,166 B2 | 7/2007 | Ganfield et al. | |
| 2003/0043823 A1 | 3/2003 | Klotsche | |
| 2004/0001484 A1 | 1/2004 | Ozguner | |
| 2004/0001486 A1 | 1/2004 | Ozguner | |
| 2004/0003110 A1 | 1/2004 | Ozguner | |
| 2004/0156368 A1* | 8/2004 | Barri et al. | 370/395.63 |
| 2004/0221066 A1 | 11/2004 | Ganfield et al. | |
| 2005/0021837 A1 | 1/2005 | Haselhorst et al. | |

* cited by examiner

*Primary Examiner* — Melanie Jagannathan
(74) *Attorney, Agent, or Firm* — Joan Pennington

(57) ABSTRACT

A method and apparatus are provided for implementing frame alteration commands in a communications network processor. A set of frame alteration instruction templates is defined. A frame alteration instruction template is identified based upon the packet type recognition result of a received packet. A frame alteration instruction stream is generated utilizing the frame alteration instruction template. Each of the frame alteration instruction templates includes different frame alteration commands to be performed on a packet. Pointers to indirect data bytes to be inserted in a packet are stored in the frame alteration instruction templates. The generated frame alteration instruction stream is used by hardware to provide frame alterations.

9 Claims, 3 Drawing Sheets

METHOD AND HARDWARE APPARATUS FOR IMPLEMENTING FRAME ALTERATION COMMANDS

This application is a continuation application of Ser. No. 10/463,281 filed on Jun. 17, 2003.

FIELD OF THE INVENTION

The present invention relates generally to the data processing field, and more particularly, relates to a method and apparatus for implementing frame alteration commands in a communications network processor.

DESCRIPTION OF THE RELATED ART

Network processing functions of a network processor must be performed at a high rate to avoid causing any bottleneck in the communications network. A processor and software typically handle frame alteration operations.

U.S. Pat. No. 6,546,021 to Albert Alfonse Slane, issued Apr. 8, 2003 and assigned to the present assignee, discloses a method and apparatus for user programmable packet to connection translation. When a data block is received, a protocol type for the received data block is identified based upon the media connection or port number for the received data block. A connection identification is formed utilizing a header of the received data block, responsive to the identified protocol type for the received data block. An instruction array is used with an arithmetic logic unit (ALU). Different code sequences are loaded into the instruction array based upon the user configured protocol type for a media connection or port number of the received data block.

A need exists for an improved mechanism for implementing frame alteration commands. It is desirable that such a mechanism that enables generating different frame alteration commands based upon different types of packets going over the same port or different ports and that is implemented in hardware to minimize software usage and processor overhead.

SUMMARY OF THE INVENTION

A principal object of the present invention is to provide a method and apparatus for implementing frame alteration commands in a communications network processor. Other important objects of the present invention are to provide such method and apparatus for implementing frame alteration commands in a communications network processor substantially without negative effect and that overcome some of the disadvantages of prior art arrangements.

In brief, a method and apparatus are provided for implementing frame alteration commands in a communications network processor. A set of frame alteration instruction templates is defined. A frame alteration instruction template is identified based upon the packet type recognition result of a received packet. A frame alteration instruction stream is generated utilizing the frame alteration instruction template.

In accordance with features of the invention, each of the frame alteration instruction templates includes different frame alteration commands to be performed on a packet. Pointers to indirect data bytes to be inserted in a packet are stored in the frame alteration instruction templates. The generated frame alteration instruction stream is used by hardware to provide frame alterations.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
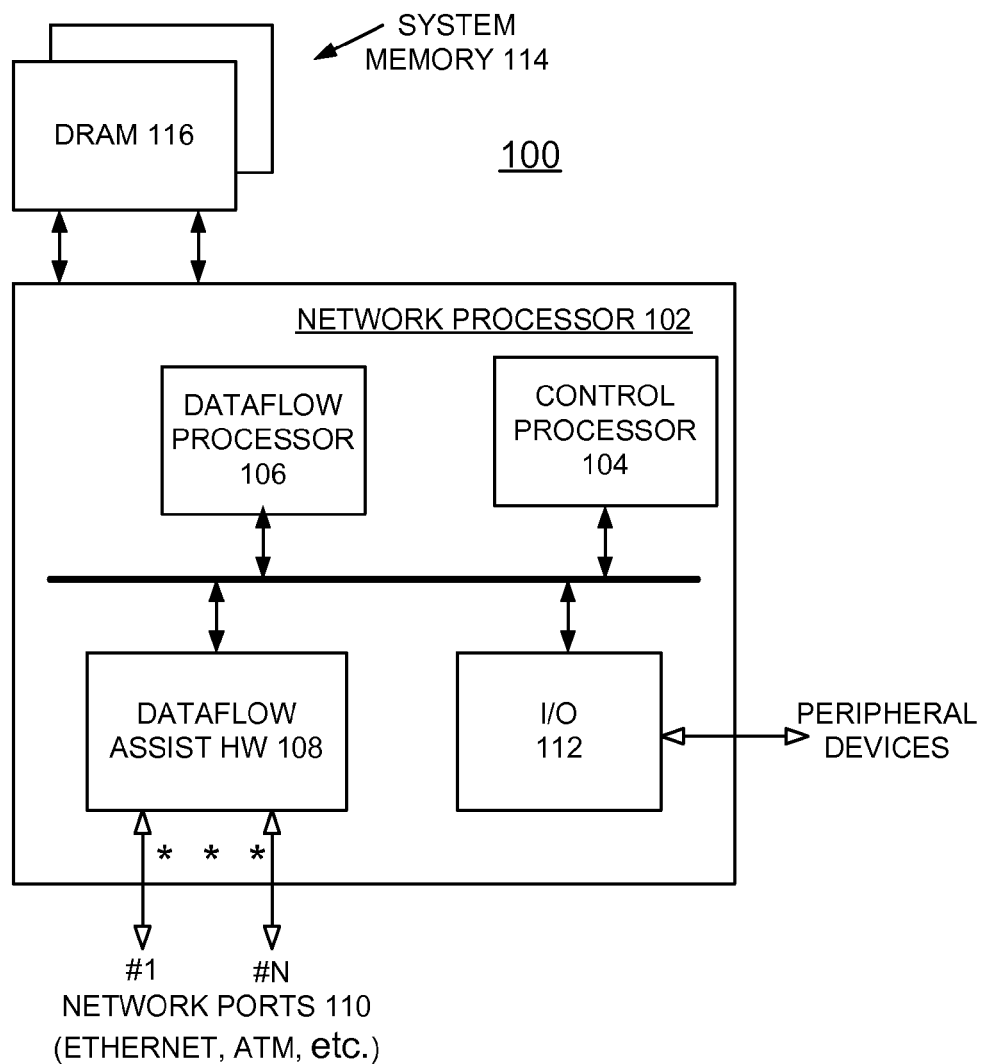
FIG. 1 is a block diagram representation illustrating a network processor system for implementing frame alteration commands in accordance with the preferred embodiment.

Having reference now to the drawings, in FIG. 1, there is shown a network processor system generally designated by the reference character 100 for carrying out methods for implementing predefined actions based upon packet classification and lookup results of the preferred embodiment. As shown in FIG. 1, network processor system 100 includes a network processor 102. Network processor system 100 includes a control processor 104, and a dataflow processor 106 coupled by a network processor bus to dataflow assist hardware (HW) 108 of the preferred embodiment. The dataflow assist hardware (HW) 108 of the preferred embodiment is coupled to multiple network ports #1-N, 110 for communicating using various ones of known network protocols, such as, an Asynchronous Transfer Mode (ATM), Ethernet, and the like. In accordance with features of the preferred embodiment, a single or multiple different protocols can be used at each of the network ports #1-N, 110. Network processor system 100 includes an input/output (I/O) 112 coupled to peripheral devices. Network processor system 100 includes a system memory 114 including a dynamic random access memory (DRAM) 116.

Network processor 102 can be implemented with various standard processors, for example, with one of the PowerPC® line of processors manufactured by International Business Machines Corporation.

Figure 2:
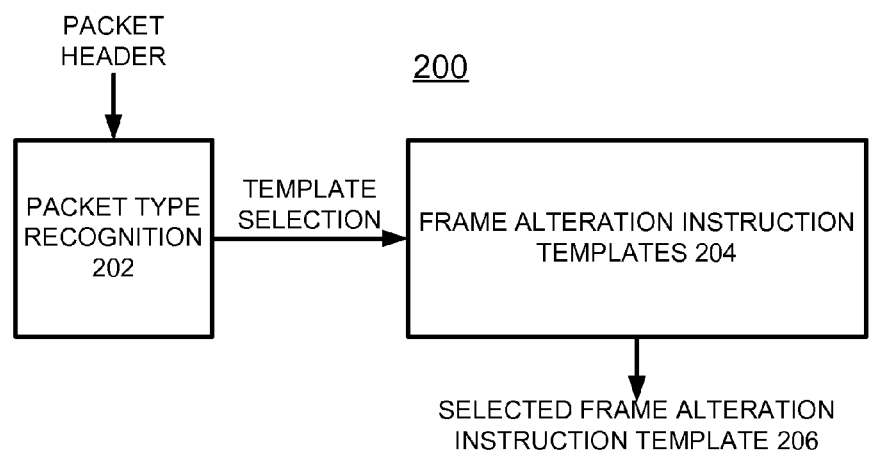
FIG. 2 is a block diagram representation illustrating an exemplary hardware mechanism for implementing frame alteration commands in the network processor system of FIG. 1 in accordance with the preferred embodiment.
Figure 3:
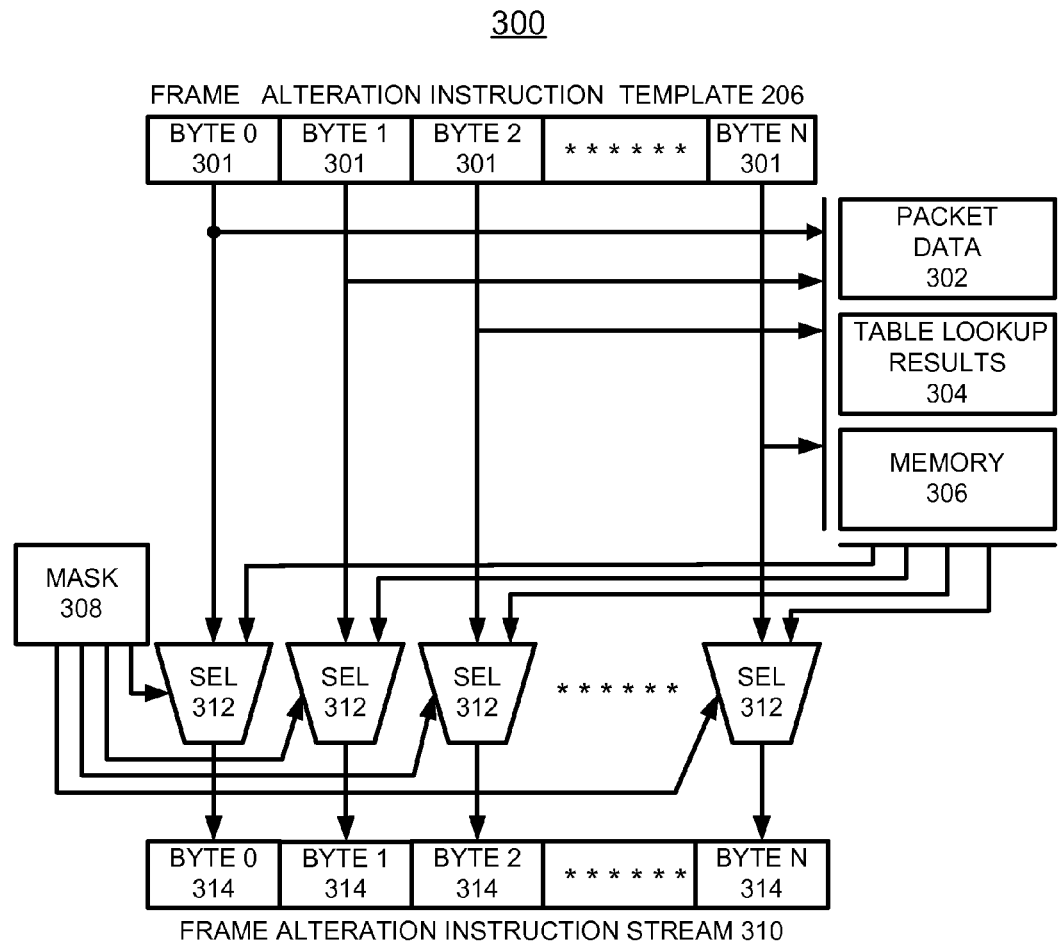
FIG. 3 is a diagram illustrating an exemplary hardware logic implementation for performing frame alterations in the network processor system of FIG. 1 in accordance with the preferred embodiment.

In accordance with features of the preferred embodiment, dataflow assist hardware (HW) 108 includes a hardware mechanism 200 and hardware logic 300, as illustrated and described with respect to FIGS. 2, and 3, for implementing frame alteration commands. Network processor 102 is enabled to effectively perform packet routing with hardware mechanism 200 and hardware logic 300 that implement a method for constructing frame alteration commands from a table within the hardware. Hardware mechanism 200 and hardware logic 300 enables routing multiple different kinds of packets for each network port 110 which can require different frame alteration commands and frame alteration data from either the packet, classification leafs, or direct bytes.

Referring now to FIGS. 2 and 3, the dataflow assist hardware (HW) 108 includes hardware mechanism 200 and hardware logic 300 for implementing frame alteration commands and performing frame alterations in the network processor system 100 in accordance with the preferred embodiment.

As shown in FIG. 2, hardware mechanism 200 includes a packet type recognition function 202 that recognizes packet types, and applies a template selection or pointer to a frame alteration instruction templates table 204. The frame alteration instruction templates table 204 holds different frame alteration commands that can be used for packet routing depending upon the type of packet classified by the packet type recognition function 202. For example, table 204 includes 32 entries or frame alteration instruction templates, each having different frame alteration commands to be performed on a packet. The template selection pointer produced by the packet type recognition function 202 determines a selected frame alteration instruction template 206.

Referring to FIG. 3, hardware logic 300 receives the selected frame alteration instruction template 206 including multiple bytes 0-N, 301 that is coupled to packet data 302, table lookup results 304, and memory 306 that includes registers within the dataflow assist hardware 108. The frame alteration instruction template 206 has the ability to get data from the original header data 302 along with data from classification leafs hit during a packet classification, for example, from table lookup results 304 and from memory 306. Each byte of frame alteration instruction template 206 in each entry has a mask 308 for creating frame alteration provided in a frame alteration instruction stream 310 via a selector 312. The mask 308 includes bits 0-N. A plurality of registers 0-N, 314 stores corresponding bytes 0-N of the generated frame alteration instruction stream 310.

Each bit of mask 308 is used to select a byte from the frame alteration instruction template 206 or a byte pointed to by the frame alteration instruction template 206 in one or more of the packet data 302, table lookup results 304, and memory 306.

Each byte 0-N of the frame alteration instruction stream 310 can either be a direct byte taken from the table frame alteration instruction template 206 or an indirect byte provided from one or more of the packet data 302, table lookup results 304, and memory 306.

The frame alteration instruction stream 310 includes frame alteration commands and can contain bytes to be inserted in the packet. The packet and generated frame alteration instruction stream 310 are stored. The frame alteration instruction stream 310 is used by other dataflow assist hardware 108 to perform frame alterations.

As an example, consider a packet that is routed via an Internet Protocol (IP) address and is sent over an Ethernet connection. Part of the IP classification at packet type recognition 202 will determine the Ethernet media access control (MAC) address of the node that the packet will be routed to next. This MAC address must replace the destination address (DA) associated with the Ethernet MAC address that the packet originally had when it arrived at the current node. The frame alteration instruction stream 310 provides commands and data for the frame alteration operations that are needed, such as: Overlay the first 6 bytes of the packet with the new MAC DA. The selected frame alteration instruction template 206 from the frame alteration command table 204 of the preferred embodiment is set up to specify one or more direct bytes representing the Op-code, position, and length of the overlay operation and one or more indirect bytes that point to the location of the MCA DA that was found during the classification process to generate a particular frame alteration instruction stream 310.

While the present invention has been described with reference to the details of the embodiments of the invention shown in the drawing, these details are not intended to limit the scope of the invention as claimed in the appended claims.

What is claimed is:

1. Apparatus for implementing frame alteration commands in a communications network processor for a plurality of packet types comprising:

a set of frame alteration instruction templates defined in a frame alteration table within hardware; each of said set of frame alteration instruction templates having different frame alteration commands to be performed on a packet and including a plurality of bytes 0-N; each of said set of frame alteration instruction templates being enabled to obtain data from an original header data together with data from classification leafs hit during a packet classification including from table lookup results and from memory;

a packet type recognition hardware function for receiving a packet header and identifying a frame alteration instruction template from said set of frame alteration instruction templates based upon a packet type recognition result; and a frame alteration instruction stream generating logic utilizing said frame alteration instruction template for generating a frame alteration instruction stream, and said frame alteration instruction stream generating logic including a mask with each byte of said plurality of bytes 0-N of said identified frame alteration instruction template for providing frame alteration data in said frame alteration instruction stream; said mask includes a plurality of bits 0-N, each bit of said mask being used to select a byte from said identified frame alteration instruction template, and to select a byte pointed to by the frame alteration instruction template in one or more of said original packet data, said table lookup results, and said memory.

2. Apparatus for implementing frame alteration commands as recited in claim 1 wherein each said frame alteration instruction template is stored in said frame alteration table within hardware, and each said frame alteration instruction template includes said plurality of bytes 0-N.

3. Apparatus for implementing frame alteration commands as recited in claim 1 wherein each said frame alteration instruction template stores one or more different frame alteration commands to be performed on a packet.

4. Apparatus for implementing frame alteration commands as recited in claim 1 wherein said frame alteration instruction template stores pointers to indirect data bytes to be inserted in a packet.

5. Apparatus for implementing frame alteration commands as recited in claim 1 wherein said frame alteration instruction template stores pointers to indirect data bytes including one or more pointers to said original packet data; said table lookup results; and said memory.

6. Apparatus for implementing frame alteration commands as recited in claim 1 wherein said frame alteration instruction stream generating logic includes a selector coupled to said frame alteration instruction template, said original packet data; said table lookup results; and said memory.

7. Apparatus for implementing frame alteration commands as recited in claim 6 further includes said mask for selecting a direct byte from said frame alteration instruction template or an indirect byte provided from one or more of the said original packet data; said table lookup results; and said memory.

8. Apparatus for implementing frame alteration commands as recited in claim 1 wherein each said frame alteration instruction template and said frame alteration instruction stream include said plurality of bytes 0-N.

9. Apparatus for implementing frame alteration commands as recited in claim 8 wherein said frame alteration instruction stream generating logic includes a selector coupled to said frame alteration instruction template, said original packet data; said table lookup results; and said memory; said mask coupled to said selector for selecting a direct byte from said frame alteration instruction template or an indirect byte provided from one or more of the said original packet data; said table lookup results; and said memory.

* * * * *